United States Patent [19]
Slack et al.

[11] 3,879,060
[45] Apr. 22, 1975

[54] LIGHTWEIGHT BOAT TRAILER

[76] Inventors: Ramon Allan Slack, 1403 Glenburnie Rd., Port Credit; David N. A. Talbot, Hawthorne Cottage, Como, Canada

[22] Filed: Nov. 9, 1973

[21] Appl. No.: 414,412

[52] U.S. Cl. ............................................. 280/414 B
[51] Int. Cl. ............................................. B60p 3/10
[58] Field of Search ........ 280/414 R, 414 A, 414 B; 214/84, 505, 506

[56] References Cited
UNITED STATES PATENTS

| | | | |
|---|---|---|---|
| 2,564,702 | 8/1951 | Linneman | 280/414 B |
| 2,626,072 | 1/1953 | Holsclaw | 280/414 B X |
| 2,938,735 | 5/1960 | Bennett | 280/414 R X |
| 3,011,797 | 12/1961 | Olney | 280/414 R X |
| 3,632,138 | 1/1972 | Whiteley | 280/414 R |
| 3,756,439 | 9/1973 | Johnson | 214/84 |

*Primary Examiner*—Leo Friaglia
*Assistant Examiner*—R. Schrecengost
*Attorney, Agent, or Firm*—Fetherstonhaugh & Co.

[57] ABSTRACT

A boat trailer for lightweight boats of the type having an outwardly and downwardly extending lip that extends about the upper edge of the hull thereof. The trailer consists of a lightweight tubular towing frame which has wheels independently suspended from the frame and support rails which project upwardly from the frame. The support rails are adapted to fit in an underlying supporting relationship with respect to the lip portion of the boat which is to be supported on the frame. The support rails are arranged to secure the boat against longitudinal and lateral movement with respect to the frame. The frame includes a pair of longitudinally extending tubular members which are laterally spaced with respect to one another from adjacent the front end of the frame to the back end of the frame in a configuration conforming substantially to the shape of the upper edge of the hull. The frame eliminates the use of the support rails which underlie and engage the underside of the hull, and it is extremely light in weight and inexpensive to manufacture.

10 Claims, 6 Drawing Figures

3,879,060

LIGHTWEIGHT BOAT TRAILER

FIELD OF INVENTION

This invention relates to boat trailers and boat launching dollies. In particular, this invention relates to a boat trailer for use in transporting a lightweight boat of the type having an outwardly and downwardly extending lip extending about the upper edge of the hull thereof.

PRIOR ART

The conventional boat trailer for lightweight boats is formed with a centrally located longitudinally extending frame member having a plurality of padded hull supports projecting outwardly and upwardly therefrom at spaced intervals along the length thereof. The wheels are usually mounted on a major transverse beam which is located inwardly from the rear end of the longitudinal frame member. The support arms which project outwardly from the longitudinal frame member are designed and adapted to engage the underside of the hull of the boat which is to be towed. These known trailers require a substantial number of fabricating operations in their manufacture assembly. Furthermore, the known frames are fabricated so that they are substantially rigid and they cannot readily be taken apart for the purposes of shipping and transporting in a knocked down configuration.

Conventional boat trailers are usually very heavy in relation to the weight of a boat such as a fiberglass sail boat. The weight of many conventional trailers is such that the trailers cannot conveniently be used as boat launching dollies. Furthermore, conventional trailers are not fabricated in any manner such that they may be partially disassembled for compact storage or for transportation when not is use as a trailer. The support arms which are carried by the conventional trailers tend to distort and damage fiberglass boat hulls when in use as a result of relative movement between the hull and the support arms when in use as a trailer. The contour of the underside of the hull of a sail boat is very carefully designed in order to provide for a maximum speed through the water in use, and if attempts were made to form the support arms to closely conform to the contour of the hull, the cost of manufacturing the trailer would be increased very substantially. While attempts are made to accommodate the variations in curvature of the hull, they rely on the resilience of padding which is secured to the support arms.

SUMMARY OF INVENTION

The present invention overcomes the difficulties of the prior art and provides a simple and inexpensive lightweight boat trailer.

According to an embodiment of the present invention, a boat trailer for lightweight boats of the type having an outwardly and downwardly extending lip which extends about the upper edge thereof comprises a towing frame having wheel means mounted thereon for transporting the frame and support rail means projecting upwardly from opposite sides of the frame adapted to fit in an underlying supporting relationship with respect to portions of the lip of the boat hull to support the boat hull on said frame and secure the boat against longitudinal and lateral movement with respect to said frame.

PREFERRED EMBODIMENT

The invention will be more clearly understood after reference to the following detailed specification read in conjunction with the drawings, wherein.

With the increasing use of fiberglass in the manufacture of boat hulls it has become common practice to form a lip which extends outwardly and thereafter downwardly from the peripheral edge of the fiberglass hull.

The boat trailer of the present invention utilizes the lip sector to support the hull and thereby eliminates the support bars which are previously used to engage and support the underside of a hull during transportation on the trailer frame. As a result of the elimination of the hull support bars, the structure of the trailer has been considerably simplified.

Figure 1:
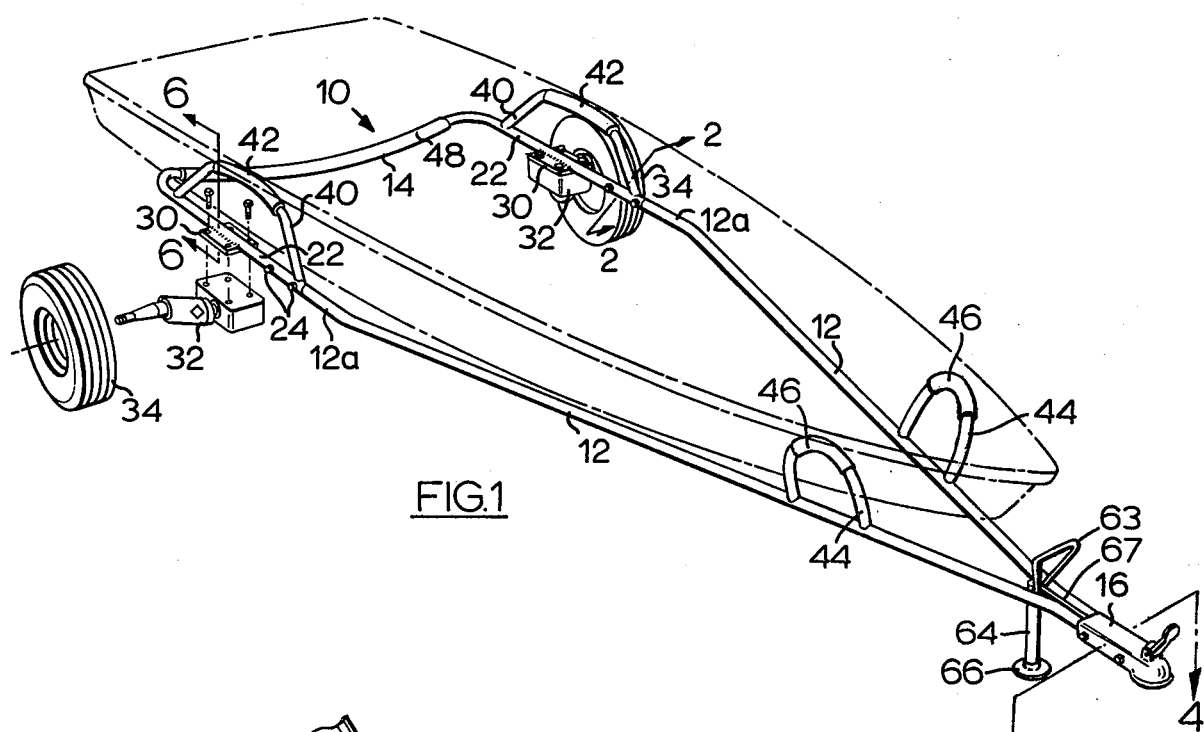
FIG. 1 is a pictorial view of the boat trailer according to an embodiment of the present invention.
Figure 2:
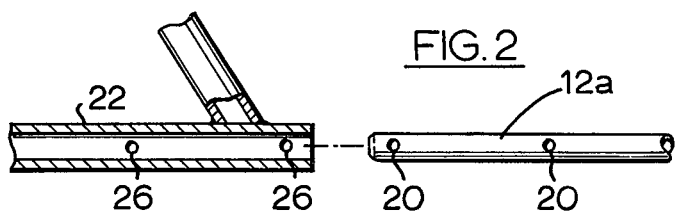
FIG. 2 is a partially sectioned exploded view of the two sections from which the frame is formed.
Figure 3:
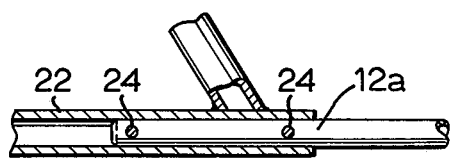
FIG. 3 is a view similar to FIG. 2 showing the frame in an assembled configuration.
Figures 4, 6:
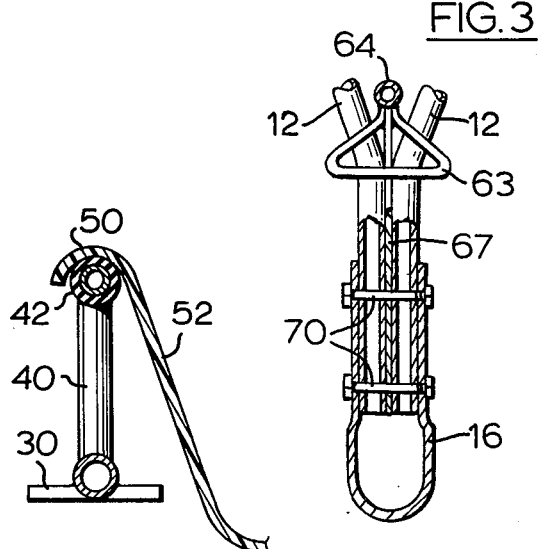
FIG. 4 is a partial pictorial view of the front end of the trailer illustrating an alternative form of support rail.
FIG. 6 is a sectional view taken along the line 6—6 of FIG. 1.

With reference to FIG. 1 of the drawings, the reference numeral 10 refers generally to a trailer according to an embodiment of the present invention. The trailer consists of a pair of longitudinal supports 12 and a U-shaped end member 14. The longitudinal members and the U-shaped end member are preferably made from standard hollow steel tubes. The longitudinal members 12 are connected at the forward end of the trailer by means of a ball socket coupler 16, which is adapted to engage a ball coupler of the type commonly attached to automobiles or the like for the purpose of pulling trailers. The longitudinal members 12 diverge in a direction away from the front end of the frame at an angle corresponding substantially to the angle at which the hull of the boat which is to be supported therein expands over its length. Short, generally parallel, sections 12a are located at the back end of the longitudinal members 12. The sections 12a have passages 20 extending therethrough. The U-shaped frame 14 has a pair of oppositely disposed arm sections 22 which are spaced apart for alignment with the sections 12a. The sections 12a are adapted to fit within the ends of the arms 22 in a close fitting sliding relationship and are secured thereto by locking pins 24 which extend through passages 26 in the arms 22 which are alignable with the passages 20 of the sections 12a. A wheel mounting bracket 30 is mounted on each of the arms 22 directly opposite one another and individual trailing link suspension units 32 are mounted on each of the brackets 30. Wheels 34 are mounted on the trailing arms 32. The suspension units provide the frame with independent wheel suspension. The suspension units may be of a conventional type of rubber torsion unit or the like which is readily available. A handle 63 and a support leg 64 are secured to a bracket 67 which is secured to frame member 12 by means of bolts 70 (FIG. 4). The support leg 64 has a length sufficient to support the front end of the trailer in an elevated position while being sufficiently clear of the road surface when the trailer is coupled to a vehicle in use.

A pair of support rails 40 are located at the back end of the frame and rigidly secured with respect to the arms 22 of the U-shaped member. The rails 40 are generally arch shaped and a bumper pad 42 is provided at the portion of the rail which immediately underlies the lip of the trailer which is to be supported thereby. A pair of arch shaped support rails 44 are located towards the front end of the trailer and also have sleeves or bumper pads 46. Bumper pads 46 may be made from resilient plastic material or rubber or the like. A bumper pad 48 is also located on the lateral frame member at the rear of the frame.

As shown in FIG. 4 of the drawings, the support rail 40, with the bumper pad 42 attached, underlies the lip portion 50 of the boat hull 52 and serves to support the boat hull 52. In cooperation with the front support rails 44 the support rails 40 serve to support the boat hull 52 in a spaced relationship with respect to the remainder of the supporting frame. The bumper pad 48 which is provided in the lateral frame member 14 serves to protect the hull of the boat from damage during launching and is preferably spaced below the boat hull during the towing operation. The concave curvature of the transverse on which the bumper pad 48 is mounted helps to line up the boat with the trailer when the boat is being relocated on the trailer for removal from the water.

The fact that the lip 50 of the hull is downwardly curved has been utilized to advantage in the present invention in that, by reason of the fact that the front support rails 44 are adapted to fit within the inwardly curved lip in the area of the bow of the boat which is diverging, the front rails 44 serve to prevent longitudinal movement of the boat with respect to the frame. The guide rails also cooperate to prevent lateral movement of the boat hull with respect to the frame.

Figure 5:
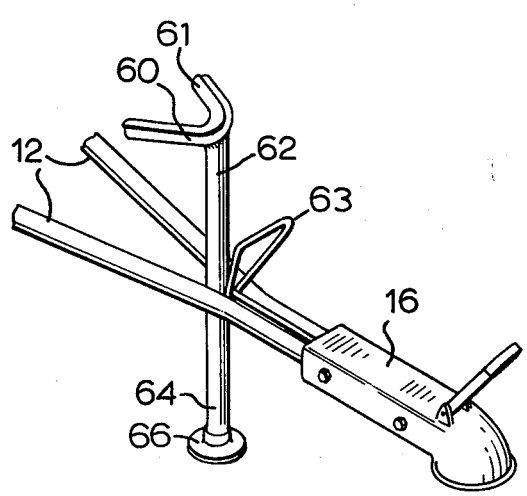
FIG. 5 is a partial sectioned view taken along the line 5—5 of FIG. 4.

With reference to FIG. 5 of the drawings, an alternative form of front support rail is illustrated. In this construction the support rail is in the form of a V-shaped member 60, which is mounted on a vertically extending post 62. The V-shaped member 60 has a bumper pad 61 of the same material as the other bumper pads which again protect the hull from damage in use. The post 62 may also have a downwardly extending portion 64, which has a mud foot 66 at the lower end thereof. The V-shaped support 60 is formed so as to fit in an underlying relationship with respect to the bow end portion of the lip of the hull and serves to restrain the hull against longitudinal movement.

The frame of the present invention is extremely simple to manufacture in view of the fact that it employs a minimum number of welding operations and it employs simple standard tubular frame members. The bending operations which are required are also extremely simple and do not require expensive bending machines.

It has been found that the trailer of the present invention, being extremely light, may be carried on top of an automobile rather than trailed behind the automobile so as to be used as a launching dolly.

Because of the open configuration of the frame, it is believed that much of the road impact shock resistance transmitted to the frame from the wheels is absorbed by the frame in the form of a torque applied to the various tubular elements of the frame. If, for example, there is relative movement between the wheel mounting plates 30 on opposite sides of the frame, this movement may be absorbed by a torque applied to the lateral frame member of the U-shaped support 14 and the moment applied by the downward weight of the boat. If, on the other hand, a force is applied to the frame tending to move the support rails 40 inwardly and outwardly, this is absorbed by way of a torque applied to the U-shaped frame 14 and also by the boat support lip. It has been found that the open configuration of the frame of the present invention permits the tubular frame members to be made from relatively light gauge material, thereby serving to further reduce the weight and amount of material used in the manufacture of the frame. A suitable frame for a lightweight boat weighing about 50–350 lbs. may be made from 1 ½ inch diameter tube having a wall thickness of 14 ga. The front to back length of the frame may be of the order of about 8–15 feet and the lateral width may be about 4–7 feet.

It will be apparent from the foregoing specification that the present invention provides a simple and inexpensive lightweight boat trailer.

What we claim as our invention is:

1. A boat trailer for lightweight boats of the type having an outwardly and downwardly extending lip which extends about the upper edge of the boat hull comprising:
    a. a towing frame,
    b. wheel means mounted on said towing frame for supporting said frame for transportation thereof,
    c. support rail means projecting upwardly from opposite sides of said frame adapted to fit in an underlying supporting relationship with respect to spaced portions of said lip of the boat to support a boat in a spaced relationship with respect to said frame and secure the boat against longitudinal and lateral movement with respect to the frame.

2. A boat trailer as claimed in claim 1 wherein said support rail means projects upwardly from said frame to a height sufficient to support a boat in a spaced relationship with respect to said frame.

3. A boat trailer as claimed in claim 1 wherein said towing frame includes a pair of longitudinally extending members which are laterally spaced with respect to one another from adjacent the front end of the frame to the back end of the frame and the laterally extending frame member extending between said laterally spaced longitudinally extending members.

4. A boat trailer as claimed in claim 3 wherein said laterally extending member is located at the back end of said longitudinally extending members.

5. A boat trailer as claimed in claim 1 wherein said towing frame has a front end and a back end and includes, a pair of longitudinally extending members which are connected at said front end of said frame and which diverge in a direction away from the front end of said frame to follow a contour closely approximating the contour of the upper edge of the boat hull which is to be carried thereby, and a laterally extending frame member connecting said longitudinal members at the back end of said frame.

6. A boat trailer as claimed in claim 1 wherein said towing frame has a front end and a back end and includes, a pair of longitudinally extending members which are connected at said front end of said frame and which diverge in a direction away from said front end of said frame and follow a contour closely approximating the contour of the upper edge of the boat hull which is to be carried thereby, and an end member which is substantially U-shaped, said end member having a pair of longitudinally extending arms aligned with and secured with respect to said longitudinal frame members, and a lateral member extending therebetween, said longitudinally extending member being laterally spaced inwardly from the portions of the lip of the hull which they underlie in use.

7. A boat trailer as claimed in claim 6 wherein said arms of said U-shaped member are releasably secured with respect to said longitudinal members whereby the trailer may be dismantled for shipping purposes.

8. A boat trailer as claimed in claim 3 including individual wheel suspension means mounting a wheel member from each of said longitudinal frame members.

9. A boat trailer as claimed in claim 1 wherein said support rail means includes a first pair of oppositely disposed support rails located adjacent the back end of said frame and a single V-shaped support rail at the front end of said frame for underlying the bow end portion of the lip of the boat end.

10. In combination, a boat and trailer supporting said boat comprising,
 a. a lightweight boat having a hull formed with an outwardly and downwardly extending lip forming a downwardly opening channel extending about the upper side edge thereof, and
 b. a lightweight trailer having;
  i. a towing frame,
  ii. wheel means mounted on said frame for supporting said frame for transportation thereof,
  iii. support rail means on opposite sides of said frame projecting upwardly into said channel means of said boat and supporting said boat hull in a spaced relationship with respect to said frame, said support rail means engaging said lip to prevent longitudinal and lateral movement of said boat with respect to said trailer.

* * * * *